Patented Apr. 24, 1945

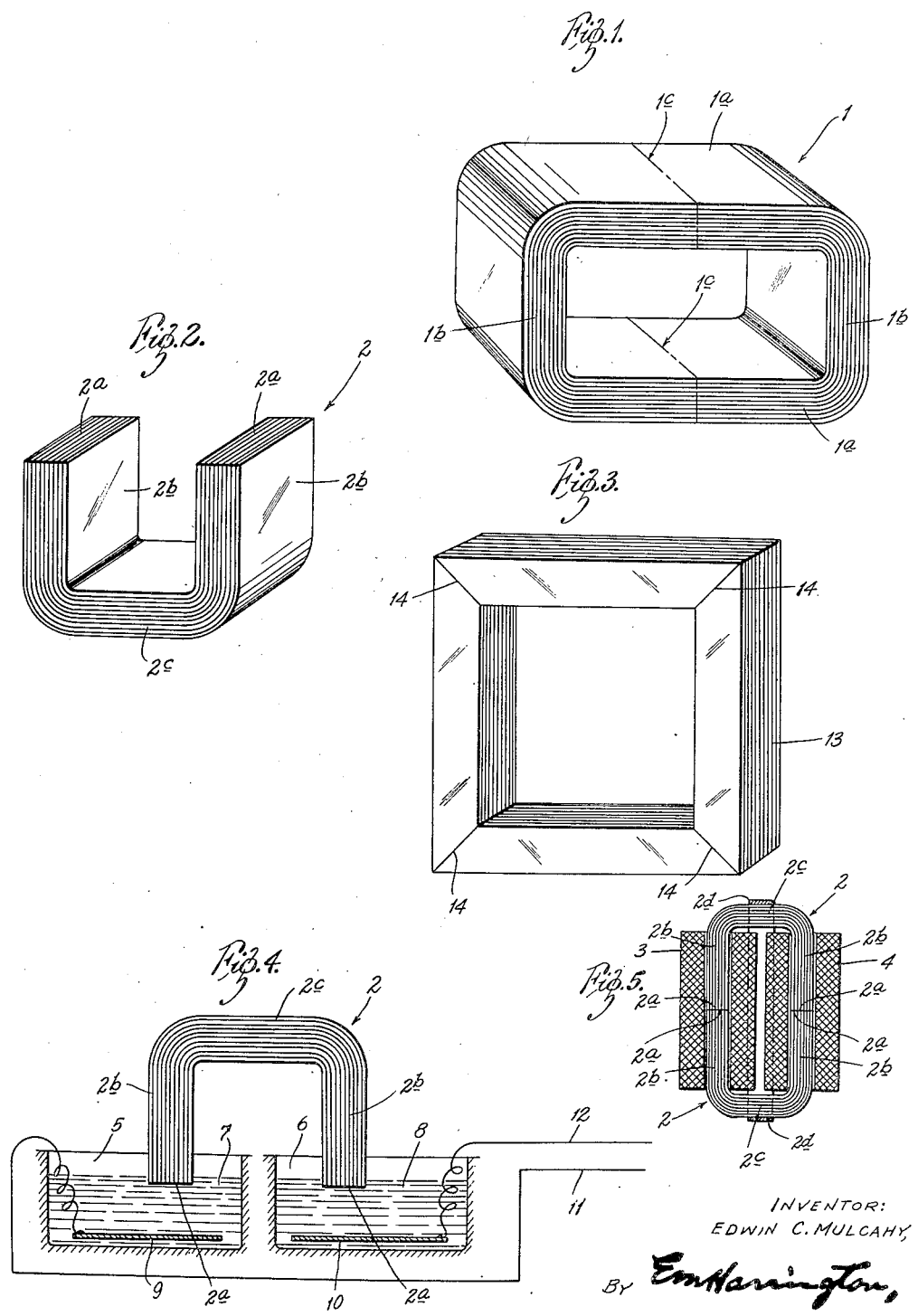

2,374,449

UNITED STATES PATENT OFFICE 2,374,449

METHOD OF PRODUCING CORES FOR ELECTRICAL INDUCTION APPARATUS

Edwin C. Mulcahy, St. Louis, Mo., assignor to Moloney Electric Company, St. Louis, Mo., a corporation of Delaware Application April 29, 1943, Serial No. 485,018

6 Claims. (Cl. 204—143)

This invention relates generally to induction apparatus, such, for instance, as transformers, and more particularly to the production of cores for induction apparatus which when assembled include butt joints between parts thereof, the predominant object of the invention being to provide an improved method for removing from certain worked or machined faces of parts of a core, which in the assembled core provide butt joints, burrs that are produced by the working or machining of said faces.

The present invention has reference particularly to cores for induction apparatus which are made up of a plurality of layers or laminations of magnetic material insulated from each other by suitable insulating material interposed between adjacent layers or laminations of said magnetic material, and bonded, or otherwise secured together, to retain said layers or laminations in their assembled condition, and where the core structure is comprised of a plurality of parts so assembled in the completed core structure as to provide butt joints between parts of the core structure. In producing such a core structure, it is highly essential that the faces of the core parts which are brought into abutting relation to provide the butt joints of the assembled core structure, be as smooth, true and matched as it is possible to make them, in order that said abutting faces may be brought into such intimate, abutting contact with each other that there will be no substantial intervening spaces or air-gaps therebetween which would interfere with efficient operation of the core when in use.

The required smooth, true, and accurate faces referred to above may be obtained by grinding, machining, or otherwise working said faces. However, it has been found that when the faces are so prepared minute burrs are formed on the layers or laminations of magnetic material which bridge the layers of insulating material between the layers or laminations of magnetic material at the prepared faces and thus provide short-circuit paths between adjacent layers or laminations of magnetic material which materially interfere with efficient operation of the core when in use by increasing iron losses and the magnetizing current of the apparatus. The prime purpose of this invention, therefore, is to provide an improved method of removing the burrs mentioned above, and this purpose is accomplished in accordance with the invention by subjecting the prepared faces of the core parts to an electrolytic pickling action which very effectively performs the desired function.

Fig. 1 is a perspective view of a core from which a pair of core parts are cut so as to provide for assembling the coils with said core.

Fig. 2 is a perspective view of one of the core parts cut from the structure illustrated in Fig. 1.

Fig. 3 is a perspective view of another type of core.

Fig. 4 is a diagrammatical view showing the manner in which burrs are removed from the prepared faces of a core part of the type illustrated in Fig. 2.

Fig. 5 is a sectional-elevation of a core and coil assembly having a core of one type to which this invention relates.

In producing the core illustrated in Fig. 1 a sheet of magnetic material is wound spirally on and about a mandrel, or other form, of proper shape and dimensions, so that the core 1 is produced. This core is preferably shaped as shown in Fig. 1; that is to say, said core 1 is oblong in cross-section, with spaced, relatively long and substantially parallel side walls 1a, and spaced relatively short and substantially parallel end walls 1b. The core 1 is wound with suitable insulating material interposed between adjacent layers of the sheet of magnetic material from which said core is produced, and when such winding has been completed the core 1 is annealed and a suitable bonding material is applied thereto so as to retain the layers or laminations of the core in their proper positions. If preferred, the layers or laminations of the core 1, instead of being bonded, may be retained in their proper positions by suitably arranged bolts or rivets, or by other suitable means.

The core 1 is then cut from end to end in the direction of its length, on lines which extend parallel with respect to the end walls 1b thereof at the approximate transverse center of the core, said cutting lines being indicated by broken lines 1c in Fig. 1. Such cutting of the core 1 produces a pair of core parts which are each of substantially U-shaped formation in cross-section, one of the core parts so cut from the core 1 being illustrated in Fig. 2 wherein it is designated by the reference character 2.

A core is produced by assembling a pair of the core parts 2, as is shown in Fig. 5; that is to say, the faces 2a of the associated core parts are arranged in abutting relation with the spaced, parallel and alined portions 2b of the core parts 2 providing the legs of the core, and the portions 2c of said core parts providing the opposed yokes of the core. Obviously, in producing a core and coil assembly with the aid of a pair of the core parts 2, as shown in Fig. 5, the core parts and the coils 3 and 4 are so assembled that said coils are disposed in embracing relation with respect to the legs of the core. Also, the core parts 2 producing the core of such a core and coil assembly as is shown in Fig. 5 are secured in their assembled relation in any suitable manner; for instance, a binding strip 2d may be arranged about the assembled core parts 2, in embracing relation with respect thereto, so as to retain the abutting faces 2a of the respective core parts in intimate contact with each other.

Because of the fact that the abutting faces 2a of a pair of core parts 2 producing a core, as shown in Fig. 5, provide the core with butt joints between leg portions of the core parts, these abutting faces must of necessity be correspondingly accurate, smooth and true so that precise matching of the abutting faces may be attained and air gaps therebetween will be reduced to a minimum. Therefore, the faces 2a of the core parts are ground, machined, or otherwise worked to provide said faces with the desired and required smoothness and accuracy. However, as previously stated herein, the grinding or machining of the faces 2a results in the formation at said faces of undesirable minute burrs which bridge the insulation between adjacent layers or laminations of the core parts and provide short-circuit paths for the magnetic flux. The predominant object of this invention relates to an improved method of removing these burrs and this method will now be described.

By referring to Fig. 4 it will be noted that a pair of receptacles 5 and 6 are provided in which bodies 7 and 8 of a suitable electrolyte are contained. Disposed within the lower portions of the receptacles 5 and 6, and submerged in the bodies of electrolyte therein, is a pair of electrodes 9 and 10, there being one electrode in each receptacle and said electrodes being connected by conductors 11 and 12 to a suitable source of electrical current (not shown). Various electrolytes may be employed, either acid or alkali, and it has been found that when the electrolyte is acid a five per cent solution functions in a highly efficient manner in carrying out the purposes of the invention. As a matter of fact it has been discovered that ordinary water from the city water supply may be employed as the electrolyte with good results, although when this is done a longer period of time is required to remove the burrs.

In practice it has been found that excellent results are attained when a five per cent solution of sulfuric acid is employed as the electrolyte, the worked face of the core part being acted on being introduced into the electrolyte and a current density is passed from the electrode, through the electrolyte to the worked face of the core part, which removes the burrs from said worked face in from one to two minutes. When direct electric current is employed, and when the type of core part illustrated in Figs. 2 and 4 is being cleaned, the burrs are removed from one face of the cort part, after which the direction of flow of the current is reversed and the other face is cleaned. Preferably the electrodes 9 and 10 are in the form of plates formed from stainless steel.

Fig. 3 illustrates a type of core different from a core made up of core parts such as that illustrated in Fig. 2. In Fig. 3 the core 13 is provided with butt joints 14, and the worked faces of the parts of the core which produce said butt joints are treated so as to remove burrs therefrom, in the manner previously described herein.

It is important to note that the electrolytes employed in removing burrs from core parts in accordance with this invention, by and of themselves are incapable of removing the burrs from the core parts, because of the weak solution of the electrolyte, and that no burrs are removed from the core parts until electrical current is passed through the electrolyte. The passage of current through the electrolyte quickly removes the burrs by an action which may be aptly described as electrolytic pickling.

I claim:

1. The method of treating a core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of electrically conductive liquid one of which is an aqueous electrolyte capable of deburring metal anodically treated therein, and passing an electric current from one body of liquid to the other through said faces of the core part to electrolytically remove the burrs from the core part face disposed in the body of said electrolyte.

2. The method of treating a core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of electrically conductive liquid one of which is an aqueous electrolyte capable of deburring metal anodically treated therein, and passing a direct electric current from one body of liquid to the other through said faces of the core part to electrolytically remove the burrs from the core part face disposed in the body of said electrolyte.

3. The method of treating a U-shaped core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of electrically conductive liquid one of which is an aqueous electrolyte capable of deburring metal anodically treated therein, and passing an electric current from one body of liquid to the other through said faces of the core part to electrolytically remove the burrs from the core part face disposed in the body of said electrolyte.

4. The method of treating a U-shaped core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of electrically conductive liquid one of which is an aqueous electrolyte capable of deburring metal anodically treated therein, and passing a direct electric current from one body of liquid to the other through said faces of the core part to electrolytically remove the burrs from the core part face disposed in the body of said electrolyte.

5. The method of treating a core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of aqueous electrolyte capable of deburring metal anodically treated therein, passing a direct electric current from one body of liquid to the other through said faces of the core part, and reversing the direction of flow of the direct electric current so as to affect electrolytic removal of the burrs located at both core part faces.

6. The method of treating a U-shaped core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of aqueous electrolyte capable of deburring metal anodically treated therein, passing a direct electric current from one body of liquid to the other through said faces of the core part, and reversing the direction of flow of the direct electric current so as to effect electrolytic removal of the burrs located at both core part faces.

EDWIN C. MULCAHY.